United States Patent

[11] 3,625,287

[72] Inventor Bill M. Young
 Duncan, Okla.
[21] Appl. No. 8,393
[22] Filed Feb. 3, 1970
[45] Patented Dec. 7, 1971
[73] Assignee Halliburton Company
 Duncan, Okla.
 Continuation of application Ser. No. 260,826, Feb. 25, 1963, now abandoned. This application Feb. 3, 1970, Ser. No. 8,393

[54] METHOD OF IMPROVING STRENGTH AND STABILITY OF SAND CONSOLIDATIONS MADE WITH RESIN SYSTEMS
 20 Claims, No Drawings
[52] U.S. Cl. .................................................. 166/295
[51] Int. Cl. ............................................... E21b 33/138
[50] Field of Search .......................................... 166/295, 276; 260/38; 55/298

[56] References Cited
 UNITED STATES PATENTS

| | | | |
|---|---|---|---|
| 2,378,817 | 6/1945 | Wrightsman et al. | 166/295 |
| 2,476,015 | 7/1949 | Wrightsman | 166/295 |
| 2,946,701 | 7/1960 | Plueddemann | 166/295 UX |
| 3,041,156 | 6/1962 | Rowse et al. | 51/298 |
| 3,052,583 | 9/1962 | Carlstrom | 260/38 |
| 3,100,527 | 8/1963 | Hilton, Jr. et al. | 166/295 |
| 3,115,930 | 12/1963 | Bernard | 166/295 |
| 3,282,338 | 11/1966 | Walther et al. | 166/295 |
| 3,285,339 | 11/1966 | Walther et al. | 166/295 |

OTHER REFERENCES

Spain, H. H., " New Plastic Checks Sand Production," The Oil and Gas Journal, Apr. 16, 1962, pp. 112 to 115. (TN 860 039) 166-295

*Primary Examiner*—Stephen J. Novosad
*Attorney*—Lyon & Lyon

ABSTRACT: The present invention relates to the use of organosilicon compounds in sand consolidation resins used in consolidating loose sands to produce a permeable sand consolidation.

METHOD OF IMPROVING STRENGTH AND STABILITY OF SAND CONSOLIDATIONS MADE WITH RESIN SYSTEMS

This is a continuation of my copending application, Ser. No. 260,826 filed Feb. 25, 1963, now abandoned.

THe present invention relates to a new and improved method of substantially increasing the strength and stability of sand consolidations, and more particularly to increasing the strength and stability of consolidated loose or incompetent sands consolidated with resins, resin forming mixtures or the like.

There are a number of methods and techniques which have been employed to prevent or inhibit the migration of loose sands with the production of crude oil. One of these methods has been the use of a resinous or resin system, wherein the unconsolidated or loose sands are wetted with a resin or resin forming material, and such resin or material is treated or cured so as to bond the sand grains of the formation together thereby forming a consolidated permeable formation.

One method of consolidating loose sands with resin is disclosed in a copending application, Ser. No. 177,188 filed March 5, 1962, now abandoned. Other methods of consolidating incompetent producing formations traversed by a well bore are disclosed in U.S. Pat. Nos. 2,378,817, 2,476,015, 2,604,172, 3,022,825 and 3,047,067.

In consolidating incompetent sands in a producing well, it is essential that the consolidation be sufficiently strong or have a compressive strength such that the flow of well fluids therethrough will not cause the consolidation to break down and cause the well to produce sand. It is also essential that the consolidation be stable in the various well fluids and at varying pressures and temperatures.

Insufficient strength of the consolidation to withstand the draw down of well fluids or instability of the consolidation in such fluids results in the well producing sand or sanding up.

It is, therefore, an important object of the present invention to provide a new and improved permeable and consolidated barrier adjacent to a well bore which is sufficiently strong and stable so as to facilitate fluid production essentially free of solids.

Another important object of the present invention is to substantially increase the compressive strength of resinous sand consolidations, particularly in permeable sand consolidations.

Another object of the present invention is to provide a new and improved method of increasing the compressive strength of sand consolidations consolidated with resins by incorporating in the resin an organosilicon compound or silane.

Still another object of the present invention is to provide a new and improved method of increasing the compressive strength of a sand consolidation consolidated with a resin by incorporating in the resin an organosilicon compound or silane which is either soluble or dispersible in the resin.

A further object of the present invention is to provide a new and improved method of increasing the compressive strength of sand consolidations consolidated with resins or resinous mixtures which may have been acid set or base set.

Yet a further object of the present invention is to provide a new and improved method of obtaining an increased compressive strength in said consolidations achieved with resin systems utilized in consolidating loose or, incompetent sands, and particularly for achieving a permeable, relatively strong and stable consolidation of the loose formation.

Other objects and advantages of the present invention will become readily apparent from a reading of the specification and claims hereinbelow.

It has been discovered that the addition of particular organosilicon compounds or silanes to a resin system or resin formulating material used in the consolidation of loose or incompetent sands results in a stronger, more stable and better set resin-sand consolidation than if no silane were added. Sand consolidations obtained with resins or resin forming mixtures containing such organosilicon compounds have a considerably greater or higher compressive strength upon setting or curing than those made with similar resins or resin forming materials containing no organosilicon compounds.

Silanes or organosilicon compounds found to be particularly useful in obtaining strong sets or high compressive strength consolidations are those having the formulas:

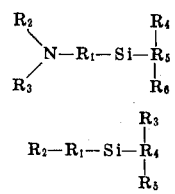

(1) and (2) $R_2-R_1-Si-\begin{smallmatrix}R_3\\|\\R_4\\|\\R_5\end{smallmatrix}$ wherein:

1.
- $R_1$ = an alkyl group having from three to 10 carbon atoms with at least three carbon atoms being in a straight chain between the silicon and nitrogen atoms,
- $R_2$ and $R_3$ = hydrogen, $R_7$, or $R_7X$, where $R_7$ is an alkyl group having from one to five carbon atoms, X is either an $NH_2$ or OH group, but both $R_2$ and $R_3$ cannot be $R_7$ alone in same compound,
- $R_4$ and $R_5$ = $R_8$ or $OR_8$ where $R_8$ is an alkyl group having from one to five carbon atoms,
- $R_6 = OR_8$;

and,

2.
- $R_1$ = an alkyl group having from two to five carbon atoms,
- $R_2$ = glycidoxy group or a cyclohexyl group having from one to two substituted epoxy groups,
- $R_3$ and $R_4$ = $R_6$ or $OR_6$ where $R_6$ is an alkyl group having from one to five carbon atoms,
- $R_5 = OR_6$.

U.S. Pat. No. 2,930,809 also discloses a number of silanes or organosilicon compounds which may be used in this invention.

Some silanes which have been found to be particularly desirable are: gamma aminopropyltriethoxysilane, N-(beta-aminoethyl)-gamma-aminopropyltrimethoxysilane, delta-aminobutylmethyldiethoxysilane, N-methyl-gamma-aminoisobutyltriethoxysilane, N-methyl-gamma-aminopropyltriethoxysilane, delta-aminobutyltriethoxysilane, N-(beta-aminoethyl)-gamma-aminopropyltriethoxysilane, gamma dialkylaminopropyltriethoxysilane, glycidoxypropyltrimethoxysilane, and 3,4 epoxycyclohexylethyltrimethoxysilane.

U. S. Pat. No. 2,832,754 describes the synthesis of alkoxysilylpropylamines and aminopropylpolysiloxanes suitable in the instant invention.

The silanes or organosilicon compounds will greatly enhance the compressive strength of any sand or silicious materials consolidated by a resin or resin forming mixture when such silanes or organosilicon compounds are dissolved or dispersed in the resin or resin forming mixture. Some silanes have been found to be more effective in certain resin systems than in others. THe silanes disclosed herein have been found to be particularly effective in resin systems such as furan of furfuryl alcohol resin, phenolic resins, urea formaldehyde resins, and epoxy resins.

A consolidation of loose or incompetent sands made with a resin, resin system or resin forming mixture having a silane or organosilicon compound as disclosed herein, dissolved or dispersed therein, will have a greater compressive strength than a consolidation of similar loose or incompetent sands made with the resin alone.

A number of laboratory tests which have been made and which illustrate conclusively the increase in compressive strength attributable to the addition of a silane to a resin or resin forming solution are as follows:

EXAMPLE I

Procedure: 60 grams of Oklahoma No. 1 sand were packed in a glass cylinder having an internal diameter of 28 mm. until the sand had reached a total height of 2.25 inch. At 15 p.s.i., the sand was flushed with the following solutions: 30 cc. standard solution of brine; 30 cc. of diesel oil; 20 grams resin blend (278:93.9:10:1, UF-85 concentrate, urea, $H_2O$ and gamma aminopropyltriethoxysilane, respectively, by weight); and 20 cc. overflush solution (1:0.03 parts by volume diesel oil and benzotrichloride, respectively). The consolidations were allowed to occur in a 150° F. environment for 17 hours. In runs Nos. 1 and 2, the silane was omitted, otherwise the ratios were the same.

Oklahoma No. 1 Sand—a white Oklahoma sand essentially free of acid soluble materials and water-swellable clays. It is composed of approximately 99 percent sand grains ranging from 60–20 mesh (U. S. Standard) in size.

Standard Brine Solution—a solution consisting of 240:18.1:1.34:1 parts by weight of $H_2O$, NaCl, $CaCl_2$, and $MgCl_2 \cdot 6H_2O$, respectively.

UF-85 Concentrate—a liquid chemical mixture of urea and formaldehyde made by Allied Chemical Corp. Its composition is 25 percent urea, 60 percent formaldehyde and 15 percent water. The mole ratio of urea to formaldehyde is 1:4.8.

TABLE I

| Run No. | Silane Used | Compressive Strength at 80° F. in air p.s.i. | Compressive Strength at 80° F. in air after 2 hours in boiling water p.s.i. |
|---|---|---|---|
| 1 | No | 833 | — |
| 2 | No | — | 935 |
| 3 | Yes | 1,750 | — |
| 4 | Yes | — | 1,551 |

EXAMPLE II

Procedure: 30 grams of Oklahoma No. 1 sand were packed in a cylinder having an internal diameter of 0.75 inches to a height of 2.5 inches. At 15 p.s.i., the sand was flushed with the following solutions: a 15 cc. brine solution of the formulation of example I; 15 cc. of diesel oil, 15 cc. of consolidating fluid or resin blend (75.3:88:29.73:31.67:1, furfuryl alcohol, UF-85 concentrate, urea, water and gamma aminopropyltriethoxysilane, respectively, by weight); 7.5 cc. diesel oil; and, 15 cc. of overflush solution (1.0:0.12 parts by volume of diesel oil and benzotrichloride, respectively). All consolidations occurred in a 140° F. environment for 17 hours. The silane was omitted in run No. 1, otherwise the ratios were the same.

TABLE II

| Run No. | Silane Used | Compressive Strength at 80° F. in air p.s.i. |
|---|---|---|
| 1 | No | 749 |
| 2 | Yes | 2,140 |

EXAMPLE III

Procedure: 20–40 mesh Ottawa sand was coated with an epoxy resin consolidating mixture by mixing the sand and resin mixture in a Mix-Master Blender. After blending, the treated sand was placed in 2 inch × 2 inch × 2 inch cubes and allowed to consolidate in an air environment of 350° for 3 hours.

Three resin-sand blends were prepared as follows:

Blend No. 1: 3000:100:20 parts by weight, respectively, of sand, Epon 828 and Catalyst Z.

Blend No. 2: identical with blend No. 1, but prior to blending, surfaces of sand were saturated with a 1 percent aqueous solution of gamma aminopropyltriethoxysilane and then dried.

Blend No. 3: 3191.5:105.6:21.28:1 parts by weight, respectively, of said, Epon 828, Catalyst Z, and gamma aminopropyltriethoxysilane.

Epon 828—an epoxy resin made by Shell Oil Co.

Catalyst Z—the curing agent or hardener for Epon 828 and also made by Shell Oil CO.

TABLE III

| Blend No. | 180° F. compressive strength of consolidation (p.s.i.) | | |
|---|---|---|---|
| | Immediately after preparation | After being boiled 2 hours in brine | After being boiled 6 hours in brine |
| 1 | 3,308 | 2,158 | 2,117 |
| 2 | 5,317 | 4,825 | 4,667 |
| 3 | 5,154 | 5,325 | 5,125 |

Note: The above figures represent the average compressive strength of three separate consolidations. Brine solution was standard brine solution of example I.

A variety of silanes or organosilicon compounds were tested in furfuryl alcohol, phenolformaldehyde and urea formaldehyde resin systems as follows:

EXAMPLE IV

Procedure: A section of glass tubing, 1 in. I.D. × 7 inch in length, sleeved with 1-15/16 inch I.D. Buna N rubber tubing was vertically mounted on a ring stand. A perforated rubber stopper was inserted in the lower end of the glass column. A small section of copper wire screen was positioned over the perforation, and over this screen was placed a thin section of glass wool.

Oklahoma No. 1 sand containing 12 percent calcium carbonate (marble chips crushed to essentially same particle size as sand), by weight, was packed in the tubing to a height of 2.5 inch. The sand was then flushed with the following solutions: 30 cc. of standard brine solution of example I; 30 cc. of diesel oil; 15 cc. of consolidating fluid or resin system; 250 cc. of diesel oil; and 250 cc. of catalyst—diesel oil solution (82:1 parts by weight of diesel oil and trichloroacetic acid). All fluids were heated to 140° F. prior to squeezing through the sand. Fluid injection pressure was 4–6 p.s.i. Compressive strengths measurements were made on the cores as they were exposed to air at 80 ° F.

TABLE IV

| Silane | 80° F. compressive strength (p.s.i.), resin system | | |
|---|---|---|---|
| | Furfuryl alcohol (a) | Phenol formaldehyde (b) | Urea formaldehyde (c) |
| None | 834 | 696 | 255 |
| Gamma aminopropyltriethoxysilane | 3,000 | 3,000 | 915 |
| N-(beta-aminoethyl)-gamma-aminopropyltrimethoxysilane | 3,000 | 1,223 | 1,072 |
| Delta-aminobutylmethyldiethoxysilane | 2,396 | 1,044 | |
| N-methyl-gamma-aminoisobutyltriethoxysilane | 1,710 | 986 | |
| N-methyl-gamma-aminopropyltriethoxysilane | 1,652 | 1,357 | |
| Delta-aminobutyltriethoxysilane | 1,681 | 1,029 | |

TABLE IV—Continued

| Silane | 80° F. compressive strength (p.s.i.), resin system | | |
|---|---|---|---|
| | Furfuryl alcohol (a) | Phenol formaldehyde (b) | Urea formaldehyde (c) |
| N-(beta-aminoethyl)-gamma-aminopropyltriethoxysilane | 1,646 | | 684 |
| Gamma dialkylaminopropyltriethoxysilane | 1,646 | 1,677 | 434 |
| Glycidoxypropyltrimethoxysilane | 875 | 1,632 | 354 |
| 3,4 epoxycyclohexylethyltrimethoxysilane | 1,228 | 1,438 | 342 |

Notes:

a. For each sample 121:1.42 parts by weight of Durez 21687 resin and silane, respectively, were used.
b. For each sample 121:226:1.42 parts by weight of Durez 21857 resin, isopropanol and silane, respectively, were used.
c. For each sample 132:44.6:47.5:1.42 parts by weight of UF-85 concentrate, urea, water and silane, respectively, were used.

The following silanes did not appear to be soluble in the urea-formaldehyde system: delta-aminobutylmethyldiethoxysilane, N-methyl-gamma-aminoisobutyltriethoxysilane, delta-aminobutyltriethoxysilane, and gamma-aminopropylsilicone.

In improving the compressive strengths of the various resins with silanes or organosilicon compounds, it is generally preferred to use relatively small amounts of the silanes, a preferred range being from 0.1–10 parts by weight of resin formulation. Amounts of silane up to 50 parts by weight of resin formulation may be used if desired, but little or no additional benefit will be achieved therefrom.

A number of field tests have been successfully performed using gamma aminopropyltriethoxysilane in the sand consolidation fluid.

One particular field job on a well in southeast Louisiana, using a new and improved sand consolidation system disclosed in detail in copending U.S. application, Ser. No. 260,831 filed even date herewith, and now U.S. pat. No. 3,199,590, is set forth hereinbelow:

Well Information:
Perforated interval — 2682 feet –2686 feet
No. of perforations — 5
Fluid in hole — salt water
Casing — 2⅞-inch tubing
Tubing — 1 inch Well History:
This was a newly completed well in a field known as a troublesome sand producer, and operator therefore determined to use a sand control measure from the beginning. After perforating, pressure was maintained on the formation to prevent sand from coming in the tubing. A plastic job for controlling the sand was previously performed by another company using a six-barrel resin or plastic treatment. After a suitable time, well was tested, and after trying to flow, went dead. On swabbing the well, sand broke in.

Well Treatment:
1. Approximately 12-15 cu. feet of sand were cleaned out of the 1 inch tubing.
2. Well was cleaned out with salt water and the 1 inch tubing was left in the hole.
3. The salt water was displaced from the tubing and the annulus with diesel oil using a maximum pressure of 600 p.s.i.
4. At 10:00 A.M. the well was preflushed with 4 gallons of Hyflo, a well-known surface active agent or surfactant, in 10 barrels of diesel oil at rate of one-half bbl./minute with a pressure in annulus of 350 p.s.i. and in tubing of 1,100 p.s.i.
5. At 11:37 A.M. the consolidating fluid was pumped into the formation at a rate of one-half bbl./minute with a pressure in annulus of 300 p.s.i. and in tubing of 1,250 p.s.i. The consolidating fluid hit formation and pressure in tubing rose to 1,350 p.s.i. At 11:47 A.M., 4 barrels of consolidating fluid had been placed in formation and pressure in annulus was 350 p.s.i.

The consolidating or treating fluid was prepared by mixing in sequence the following materials in a 14-barrel ribbon blender:
a. 1 drum (50–52 gallons) of Durez 21687 furfuryl alcohol resin
b. 3 quarts of gamma aminopropyltriethoxysilane
c. 2 drums of furfuryl alcohol
d. 1 gallon of Hyflo
e. 5 gallons of fresh water
6. The consolidating fluid was followed with 1½ barrels of clean diesel oil spacer.
7. At 12:38 P.M., 18 barrels of an afterflush of 200 pounds of trichloroacetic acid in 28 barrels of diesel oil were pumped into the formation. The displacement was finished at 12:44 P.M.
8. Well closed in for 48 hours and then swabbed.

Results:

After swabbing, the well was flowing oil, sand free, with about 300 p.s.i., producing 65 barrels of fluid of approximately equal amounts of oil and salt water. With an allowable of only 28 barrels per day, the well was producing greater than its allowable. Two weeks later production was unchanged with still no trace of sand.

Six months later the well was still producing sand-free oil at substantially the same rate.

Broadly, the present invention relates to a method of improving the compressive strength and stabilization of sand consolidaitons by the inclusion of a silane or organosilane in the consolidating fluid, resin or resin-forming mixture.

Although the present invention is particularly directed to sand consolidations wherein a permeable sand consolidation is desired, it may also be used in impermeable consolidations, and the use, therefore, is contemplated in this invention. sand

What is claimed is:
1. A method of consolidating loose sand comprising the steps of admixing said sand with a composite of a resin, resin-forming mixture of the like and an organosilicon compound and consolidating said sand at a subterranean location to produce a permeable sand consolidation, said quantity being sufficient to increase the compressive strength of said consolidation over that which it would possess in the absence of said organosilicon compound.
2. The method of claim 1 wherein said resin-forming mixture forms a resin selected from the group consisting of furfuryl alcohol resins, phenolic resins, urea formaldehyde resins and epoxy resins.
3. The method of claim 1 wherein said organosilicon compound is present in an amount of up to about 50 percent by weight of said resin.
4. The method of claim 1, wherein said organosilicon compound is selected from the group consisting of compounds having the formulas:

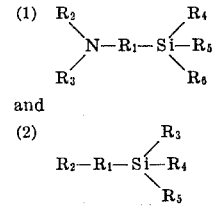

wherein:
1.
$R_1$ = an alkyl group having from three to 10 carbon atoms with at least three carbon atoms being in a straight chain between the silicon and nitrogen atoms, $R_2$ and $R_3$ = Hydrogen, $R_7$, or $R_7X$, where $R_7$ is an alkyl group having from one to five carbon atoms, X is either an $NH_2$ or OH group, but both $R_2$ and $R_3$ cannot be $R_7$ alone in same compound, $R_4$ and $R_5$ = $R_8$ or $OR_8$ where $R_8$ is an alkyl group having from one to five carbon atoms, $R_6 = OR_8$;

and

2.

$R_1$ = an alkyl group having from two to five carbon atoms, $R_2$ = glycidoxy group or a cyclohexyl group having from one to two substituted epoxy groups, $R_3$ and $R_4$ = $R_6$ or $OR_6$ where R is an alkyl group having from one to five carbon atoms, $R_5 = OR_6$ 5. The method of claim 1, wherein said organosilicon compound is selected from the group consisting of, gamma aminopropyltriethoxysilane, N-(beta-aminoehtyl)-gamma-aminopropyltrimethoxysilane, delta-aminobutylmethyldiethoxysilane, N-methyl-gamma-aminoisobutyltriethoxysilane, N-methylgamma-aminopropyl-triethoxysilane, delta-aminobutyltriethoxysilane, N-(beta-aminoethyl)-gamma-aminopropyltriethoxysilane, gamma dialkylaminopropyl-triethoxysilane, glycidoxypropyltrimethoxysilane, and 3,4 epoxycyclohexylethyltrimethoxysilane.

6. A method of consolidating loose sand adjacent to a well bore at a subterranean location comprising the steps of forming a mixture comprising said sand a liquid resinous or resin-forming composition and a quantity of an organosilicon compound, and consolidating said mixture at a subterranean location to produce a permeable sand consolidation by the setting of said mixture, said quantity being sufficient to increase the strength of said consolidation over that which it would possess in the absence of said compound.

7. A method of consolidating an incompetent subterranean formation comprising the steps of introducing a composite of a liquid resinuous or resin-forming composition and a quantity of an organosilicon compound into said formation, forming a mixture comprising loose sand and said composite and consolidating said mixture to produce a permeable sand consolidation by the setting of said mixture in the area of said incompetent formation, said quantity being sufficient to increase the strength of said consolidation over that which it would possess in the absence of said compound.

8. The method of claim 7 wherein said resin-forming mixture forms a resin selected form the group consisting of furfuryl alcohol resins, phenolic resins, urea formaldehyde resins and epoxy resins.

9. The method of claim 7 wherein said organosilicon compound is present in an amount of up to about 50 percent by weight of said resin.

10. The method of claim 7, wherein said organosilicon compound is selected from the group consisting of compounds having the formulas:

(1) 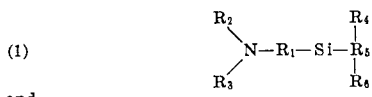

and (2) 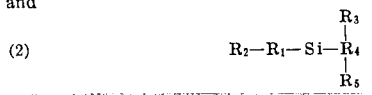

wherein:

1.
an alkyl group having from three to 10 carbon atoms with at least three carbon atoms being in a straight chain between the silicon and nitrogen atoms, $R_2$ and $R_3$ = Hydrogen, $R_7$, or $R_7X$, where $R_7$ is an alkyl group having from one to five carbon atoms, X is either an $NH_2$ or OH group, but both $R_2$ and $R_3$ cannot be $R_7$ alone in same compounds, $R_4$ and $R_5$ = $R_8$ or $OR_8$ where $R_8$ is an alkyl group having from one to five carbon atoms, $R_6 = OR_8$;

and

2.

$R_1$ = an alkyl group having from two to five carbon atoms, $R_2$ = glycidoxy group or a cyclohexyl group having from one to two substituted epoxy groups, $R_3$ and $R_4$ = $R_6$ or $OR_6$ where $R_6$ is an alkyl group having from one to five carbon atoms, $R_5 = OR_6$.

11. The method of claim 7 wherein said organosilicon compound is selected from the group consisting of, gamma aminopropyltriethoxysilane, N-(beta-aminoethyl)-gamma-aminopropyltrimethoxysilane, delta-aminobutylmethyldiethoxysilane, N-methyl-gamma-aminoisobutyltriethoxysilane, N-methyl-gamma-aminopropyl-triethoxysilane, delta-aminobutyltriethoxysilane, N-(beta-aminoethyl)-gamma-aminopropyltriethoxysilane, gamma dialkylaminopropyl-triethoxysilane, glycidoxypropyltrimethoxysilane, and 3,4 epoxycyclohexylethyltrimethoxysilane.

12. A method of consolidating an incompetent subterranean formation comprising the steps of introducing a consolidating fluid comprising a liquid resinous or resin-forming composition into said formation, said composition having dissolved or dispersed therein a quantity of an organosilicon compounds, and consolidating said formation by the setting of said fluid.

13. A method of consolidating an incompetent subterranean formation consisting of the steps of:

a. dispersing a quantity of an organofunctional silane in a liquid resinous composition to form a consolidating fluid; and b. introducing said consolidating fluid into said incompetent formation whereupon said consolidating fluid sets and thereby consolidates said formation.

14. A method of permeably consolidating loose sands at a subterranean location, comprising the steps of: (a) dispersing in a consolidating fluid consisting of resins and resin forming mixtures, from about 0.1 to about 10 parts, by weight of said consolidating fluid of an organosilicon compound selected from the group consisting of compounds having the formulas:

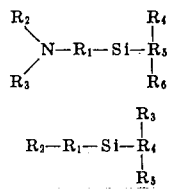

wherein:

1.

$R_1$ = an alkyl group having from three to 10 carbon atoms with at least three carbon atoms being in a straight chain between the silicon and nitrogen atoms, $R_2$ and $R_3$ = Hydrogen, $R_7$, or $R_7X$, where $R_7$ is an alkyl group having from one to five carbon atoms, X is either an $NH_2$ or OH group, but both $R_2$ and $R_3$ cannot be $R_7$ alone in same compound, $R_4$ and $R_5$ = $R_8$ or $OR_8$ where $R_8$ is an alkyl group having from one to five carbon atoms, $R_6 = OR_8$;

and,

2.

an alkyl group having from two to five carbon atoms, glycidoxy group or a cyclohexyl group having from one to two substituted epoxy groups, $R_3$ and $R_4 = R_6$ or $OR_6$ where $R_6$ is an alkyl group having from one to five carbon atoms, $R_5 = OR_6$;

b. introducing the consolidating fluid into the loose sands to form a mixture of consolidating fluid and sand, and c. consolidating said mixture to produce a permeable sand consolidation.

15. The method of consolidating an incompetent stratum in a subterranean formation penetrated by a well which comprises injecting down the borehole of the well and into contact with at least a portion of said stratum a composition consisting essentially of a liquid resin settable to a fluid-permeable solid, a bonding material consisting essentially of [3-(glycidyloxy)propyl] trimethoxysilane in an amount of between about 0.15 and about 10 percent, based on the volume of resin employed, whereby the bonding material is brought into contact with at least a portion of the individual grains comprising the exposed incompetent formation and provides a bond between such grains and said liquid resin, and an organic carrier vehicle selected from the class consisting of $C_1$ to $C_4$ aliphatic alcohols, removing residual liquid composition from the borehole and retaining said composition in contact with the incompetent stratum until the composition has substantially set to form a unitary fluid-permeable consolidated mass with contacted particles of said stratum.

16. The method according to claim 15 wherein the amount of said bonding material is between about 0.5 and about 5 percent by volume of the resin employed.

17. The method according to claim 15 wherein said resin is a phenol-formaldehyde condensation product dispersed in A $C_1$ to $C_4$ aliphatic alcohol.

18. The method according to claim 15 wherein said resin is an epoxy resin containing a hardening agent.

19. The method according to claim 15 which includes the step of pre-flushing the well with a liquid hydrocarbon prior to injection of said composition.

20. The method according to claim 15 which includes the step of postflushing the well with a liquid hydrocarbon following injection and removal of any residual liquid composition from the borehole of said composition.

* * * * *

UNITED STATES PATENT OFFICE
CERTIFICATE OF CORRECTION

Patent No. 3,625,287          Dated December 7, 1971

Inventor(s) Bill M. Young

It is certified that error appears in the above-identified patent and that said Letters Patent are hereby corrected as shown below:

Column 2, line 64 change "of" to --or--
Column 3, line 9 change "278:93.9:10:1" to --278:93.9:100:1--
Column 3, line 19 change "60-20" to --60-200--
Column 3, line 22 change "Mg Cl$_2$ . 6bH$_2$O" to --Mg Cl$_2$ . 6H$_2$O--

Column 3, Table I should read:

| Run No. | Silane Used | Compressive Strength at 80° F. in air psi | Compressive Strength at 80° F. in air after 2 hours in boiling water psi |
|---|---|---|---|
| 1 | No | 833 | - |
| 2 | No | - | 935 |
| 3 | Yes | 1750 | - |
| 4 | Yes | - | 1551 |

Column 4, line 7 change "350º" to --350°F--
Column 4, line 17 change "said" to --sand--
Column 4, line 43 change "1-15/16" to --a 15/16--
Column 6, line 40 delete "sand"
Claim 1, line 3 after "mixture" change "of" to --or--
Claim 1, line 3 after "and" insert --a quantity of--
Claim 5, line 3 change "aminoehtyl" to --aminoethyl--

Signed and sealed this 25th day of July 1972.

(SEAL)
Attest:

EDWARD M. FLETCHER, JR.
Attesting Officer

ROBERT GOTTSCHALK
Commissioner of Patents

UNITED STATES PATENT OFFICE
CERTIFICATE OF CORRECTION

Patent No. __3,625,287__      Dated __December 7, 1971__

Inventor(s) __Bill M. Young__

It is certified that error appears in the above-identified patent and that said Letters Patent are hereby corrected as shown below:

In Column 2, lines 6 through 14 thereof;
In Column 7, Claim 10, lines 59 through 66 thereof;
In Column 8, Claim 14, lines 49 through 56 thereof;
the formulas should appear as follows:

(1) 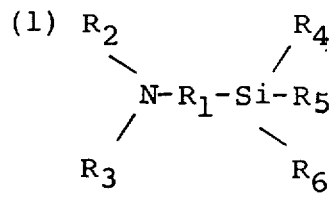

and (2) 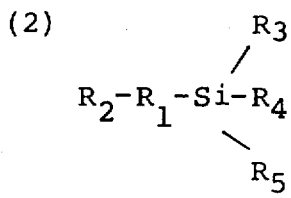

Signed and sealed this 1st day of May 1973.

(SEAL)
Attest:

EDWARD M. FLETCHER, JR.         ROBERT GOTTSCHALK
Attesting Officer               Commissioner of Patents